United States Patent
Suda et al.

(10) Patent No.: US 8,754,180 B2
(45) Date of Patent: Jun. 17, 2014

(54) ACTIVE-ENERGY-RAY-CURABLE RESIN COMPOSITION, CURED PRODUCT THEREOF, AND FILM

(75) Inventors: Haruna Suda, Ichihara (JP); Youichi Tanimoto, Ichihara (JP); Norio Kosaka, Ichihara (JP); Tsuneyuki Ohtaguro, Ichihara (JP)

(73) Assignee: DIC Corporation, Tokyo (JP)

( * ) Notice: Subject to any disclaimer, the term of this patent is extended or adjusted under 35 U.S.C. 154(b) by 152 days.

(21) Appl. No.: 13/496,210

(22) PCT Filed: Sep. 14, 2010

(86) PCT No.: PCT/JP2010/065779
§ 371 (c)(1),
(2), (4) Date: May 23, 2012

(87) PCT Pub. No.: WO2011/034035
PCT Pub. Date: Mar. 24, 2011

(65) Prior Publication Data
US 2012/0252998 A1     Oct. 4, 2012

(30) Foreign Application Priority Data

Sep. 18, 2009   (JP) .................................. 2009-216999

(51) Int. Cl.
*C08F 26/02*     (2006.01)
*C08F 118/02*    (2006.01)
*C08F 2/46*      (2006.01)
*C08F 2/48*      (2006.01)

(52) U.S. Cl.
USPC ........... 526/312; 526/319; 427/487; 427/496; 427/508

(58) Field of Classification Search
USPC ........... 526/312, 319; 427/427, 487, 496, 508
See application file for complete search history.

(56) References Cited

U.S. PATENT DOCUMENTS

| | | | |
|---|---|---|---|
| 8,414,979 B2 * | 4/2013 | Yamashina et al. | 427/487 |
| 2009/0148651 A1 | 6/2009 | Tokuda et al. | |
| 2010/0173229 A1 * | 7/2010 | Hikida et al. | 430/2 |

FOREIGN PATENT DOCUMENTS

| | | | |
|---|---|---|---|
| JP | 05-214063 A | | 8/1993 |
| JP | 2002241646 A | * | 8/2002 |
| JP | 2007131837 A | * | 5/2007 |
| JP | 2008-247982 A | | 10/2008 |
| JP | 2008-255301 A | | 10/2008 |
| WO | WO-2006/082776 A1 | | 8/2006 |
| WO | WO 2008108358 A1 | * | 9/2008 |
| WO | WO-2008/120984 A1 | | 10/2008 |
| WO | WO-2009/069548 A1 | | 6/2009 |
| WO | WO-2010/090116 A1 | | 8/2010 |

OTHER PUBLICATIONS

International Search Report dated Nov. 16, 2010, issued for PCT/JP2010/065779.
Notification of Reasons for Refusal mailed Mar. 22, 2011, issued for the Japanese patent application No. 2011-503279 and English translation thereof.
Notice Requesting Submission of Opinion mailed Sep. 13, 2013, issued for the Korean patent application No. 10-2012-7006130 and English and Japanese translation thereof.
Supplementary European Search Report dated Aug. 8, 2013, issued for the European patent application No. 10817148.9.

* cited by examiner

*Primary Examiner* — Michael M Bernshteyn
(74) *Attorney, Agent, or Firm* — Edwards Wildman Palmer LLP

(57) ABSTRACT

Provided is an active-energy-ray-curable resin composition for forming a hard coating layer that protects the surface of a touch panel or the like and makes fingerprints less noticeable. The active-energy-ray-curable resin composition includes a urethane (meth)acrylate (A) prepared through a reaction in which a polyalkylene glycol (C) having a weight-average molecular weight Mw in a range of 5,000 to 30,000, a polyisocyanate (D), and a (meth)acrylate (E) intramolecularly including a hydroxyl group serve as essential raw-material components; and a polyfunctional (meth)acrylate (B), with a mass ratio [(A)/(B)] of (A) to (B) being in a range of [0.1/99.9] to [15/85].

17 Claims, No Drawings

ACTIVE-ENERGY-RAY-CURABLE RESIN COMPOSITION, CURED PRODUCT THEREOF, AND FILM

TECHNICAL FIELD

The present invention relates to an active-energy-ray-curable resin composition for forming a hard coating layer that protects the surface of a touch panel.

BACKGROUND ART

In recent years, the number of devices including touch panel displays such as cellular phones, game machines, and car navigation devices has been increasing. The surfaces of such touch panels are protected by coating layers. Such a layer needs to have anti-scratch properties and anti-fingerprint properties: for example, fingerprints are less likely to be left thereon, fingerprints left thereon are less likely to be noticed, and fingerprints left thereon are easily wiped off. Among these anti-fingerprint properties, the property that fingerprints are less likely to be noticed is considered as being the most important.

A hard coating layer has surface irregularities so that fingerprints left thereon are less likely to be noticed (antiglare hard coating layer). Such an antiglare hard coating layer is produced by, for example, preparing an alumina sol solution by adding water to a mixed solution containing an aluminum alkoxide, an organic solvent, and a chelating agent, applying the alumina sol solution to a plastic film, drying the applied solution to form an amorphous alumina layer, and subsequently immersing the alumina layer into a hot water having an electrical conductivity of 200 μS/cm or less to roughen the surface of the alumina layer.

The formation of the antiglare hard coating layer requires the above-described complex steps. In addition, the antiglare hard coating layer has a drawback that images seen therethrough are not displayed with sufficiently high definition.

There is another hard coating layer that does not have surface irregularities (clear hard coating layer). Since the clear hard coating layer does not have surface irregularities, it provides images with high definition therethrough. In addition, this hard coating layer is advantageous in that it can be readily formed by just applying a hard coating agent to a plastic film and drying the applied agent. However, since the clear hard coating layer does not have surface irregularities, fingerprints left on the hard coating layer are likely to be noticed. Accordingly, there have been demands for a hard coating layer in which fingerprints are less likely to be noticed and fingerprints left thereon are easily wiped off.

To form a hard coating layer in which fingerprints are less likely to be noticed and fingerprints left thereon are easily wiped off, for example, there is a photo-curable resin composition containing a urethane (meth)acrylate that intramolecularly has a polyether skeleton derived from a polyether polyol having a weight-average molecular weight (Mw) of about 1000 to 3000, and has a (meth)acryloyl group at a single end (for example, refer to Patent Literature 1). However, even the photo-curable composition disclosed in Patent Literature 1 does not sufficiently provide ease of wiping off fingerprints. Accordingly, the development of a hard coating agent that can provide high anti-fingerprint properties and high anti-scratch properties has been demanded.

CITATION LIST

Patent Literature

PTL 1: Japanese Unexamined Patent Application Publication No. 2008-255301 (page 2)

SUMMARY OF INVENTION

Technical Problem

An object of the present invention is to provide an active-energy-ray-curable resin composition that is used for forming a clear hard coating layer and provides a cured coating film having high anti-fingerprint properties and high anti-scratch properties, that is, provides a coating film having a high hardness in which fingerprints are less likely to be noticed and fingerprints left thereon are easily wiped off; a cured product formed by curing the composition; and a film having a cured layer formed from the composition.

Solution to Problem

The inventors of the present invention performed thorough studies. As a result, the inventors have found the following findings: for example, use of a composition containing a urethane (meth)acrylate (A) obtained through a reaction in which a polyalkylene glycol (C) having a weight-average molecular weight (Mw) of about 5,000 to 30,000 and serving as an essential raw-material component, provides a hard coating layer in which fingerprints are less likely to be noticed and fingerprints left thereon are easily wiped off; and a cured layer formed by curing the composition has excellent anti-scratch properties. Thus, the inventors have accomplished the present invention.

The present invention provides an active-energy-ray-curable resin composition including a urethane (meth)acrylate (A) prepared through a reaction in which a polyalkylene glycol (C) having a weight-average molecular weight (Mw) in a range of 5,000 to 30,000, a polyisocyanate (D), and a (meth)acrylate (E) intramolecularly including a hydroxyl group serve as essential raw-material components; and a polyfunctional (meth)acrylate (B), with a mass ratio [(A)/(B)] of (A) to (B) being in a range of [0.1/99.9] to [15/85].

The present invention also provides a cured product formed by curing the above-described active-energy-ray-curable resin composition.

The present invention also provides a film including a film-shaped base and a cured layer formed on the film-shaped base by curing the above-described active-energy-ray-curable resin composition.

Advantageous Effects of Invention

Use of an active-energy-ray-curable resin composition according to the present invention allows formation of a hard coating layer having excellent anti-scratch properties in which fingerprints left thereon are less likely to be noticed and fingerprints left thereon are easily wiped off. Accordingly, this composition is suitable for forming a hard coating layer for an article on which fingerprints tend to be left, such as a touch panel display.

DESCRIPTION OF EMBODIMENTS

Hereinafter, the present invention will be described in detail.

A urethane (meth)acrylate (A) used in the present invention is prepared through a reaction in which a polyalkylene glycol (C) having a weight-average molecular weight (Mw) in a range of 5,000 to 30,000, a polyisocyanate (D), and a (meth)acrylate (E) intramolecularly including a hydroxyl group serve as essential raw-material components. To make fingerprints be less likely to be noticed, diffused light reflection at the surface of the fingerprints is suppressed by uniformly spreading the fingerprints as flat as possible. In contrast, to facilitate wiping off, the contact area between the hard coating layer and fingerprints is minimized. Thus, there is a tradeoff relationship between making fingerprints be less likely to be noticed and facilitating wiping off of fingerprints. According to the present invention, an active-energy-ray-curable resin composition satisfying both of these properties having the tradeoff relationship can be achieved by using the polyalkylene glycol (C) having a weight-average molecular weight (Mw) in a range of 5,000 to 30,000 as an essential raw-material component of the urethane (meth)acrylate (A).

In the present invention, the weight-average molecular weight (Mw) and number-average molecular weight (Mn) are values measured by gel permeation chromatography (GPC) under the following conditions;

Measurement apparatus; HLC-8220GPC manufactured by Tosoh Corporation

Columns; TSK-GUARDCOLUMN SuperHZ-L manufactured by Tosoh Corporation
+TSK-GEL SuperHZM-M×4, manufactured by Tosoh Corporation Detector; RI (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 µl) obtained by filtering a tetrahydrofuran solution having a concentration of 0.2 mass % in terms of resin solid matter through a microfilter The polyalkylene glycol (C) used in the present invention has a weight-average molecular weight (Mw) in a range of 5,000 to 30,000. In particular, the polyalkylene glycol preferably has a weight-average molecular weight (Mw) in a range of 7,000 to 20,000, more preferably has a weight-average molecular weight (Mw) in a range of 10,000 to 15,000, because the resultant composition is highly balanced in terms of affinity for fingerprint components, anti-scratch properties, and compatibility.

The number of polyalkyleneoxy chains derived from a polyalkylene glycol in the urethane (meth)acrylate (A) varies depending on the molecular weight of the polyalkylene glycol used. This number is generally preferably 1 to 20 on average, more preferably 1 to 10 on average, because the resultant composition is highly balanced in terms of affinity for fingerprint components, anti-scratch properties, and compatibility. When the polyalkylene glycol has a weight-average molecular weight (Mw) in a range of 10,000 to 15,000, the number is preferably 1 to 3.

When the urethane (meth)acrylate (A) has a small number of polyalkyleneoxy chains and has a high weight-average molecular weight (Mw) per polyalkyleneoxy chain, even when the amount of the urethane (meth)acrylate (A) added is small, an active-energy-ray-curable resin composition that provides a cured coating film in which fingerprints are less likely to be noticed is obtained. In contrast, when the urethane (meth)acrylate (A) has a large number of polyalkyleneoxy chains and has a low weight-average molecular weight (Mw) per polyalkyleneoxy chain, an active-energy-ray-curable resin composition having high transparency is obtained.

Examples of the polyalkylene glycol (C) include polyethylene glycol, polypropylene glycol, polytetramethylene glycol, and polybutylene glycol. These polyalkylene glycols may be used alone or in combination of two or more thereof. Among the polyalkylene glycols, polypropylene glycol is preferred because a hard coating layer in which fingerprints are less likely to be noticed is obtained.

Examples of the polyisocyanate (D) used in the present invention include diisocyanates and polyisocyanates having three or more isocyanate groups. Examples of the diisocyanates include aromatic diisocyanates, aliphatic diisocyanates, and alicyclic diisocyanates. Examples of the aromatic diisocyanates include toluene diisocyanate (TDI), diphenylmethane diisocyanate (MDI), p-phenylene diisocyanate, naphthalene diisocyanate, xylylene diisocyanate (XDI), and tetramethylxylylene diisocyanate (TMXDI).

Examples of the aliphatic diisocyanates include hexamethylene diisoctanate (HDMI), 2,2,4-trimethylhexane diisocyanate, and lysine diisocyanate.

Examples of the alicyclic diisocyanates include 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidenedicyclohexyl-4,4'-diisocyanate, 1,3-diisocyanatomethylcyclohexane (hydrogenated XDI), hydrogenated TDI, and norbornane diisocyanate.

The polyisocyanates having three or more isocyanate groups may be prepared by, for example, turning at least one aliphatic diisocyanate compound into an isocyanurate in the presence of or in the absence of a catalyst for producing isocyanurate, such as quaternary ammonium salt; and may be isocyanurate mixtures containing, for example, a trimer, a pentamer, and a heptamer. Specific examples include isocyanurate polyisocyanate from isophorone diisocyanate, isocyanurate polyisocyanate from hexamethylene diisocyanate, isocyanurate polyisocyanate from hydrogenated xylene diisocyanate, and isocyanurate polyisocyanate from norbornane diisocyanate. These polyisocyanates (D) may be used alone or in combination of two or more thereof.

In particular, aromatic diisocyanates and alicyclic diisocyanates are preferred. In particular, toluene diisocyanate, 4,4'-dicyclohexylmethane diisocyanate, and isophorone diisocyanate are preferred.

Examples of the (meth)acrylate (E) intramolecularly including a hydroxyl group used in the present invention include hydroxy (meth)acrylates each having a single (meth)acryloyl group such as hydroxyethyl (meth)acrylate, hydroxypropyl (meth)acrylate, hydroxybutyl (meth)acrylate, and 2-hydroxy-3-phenoxypropyl (meth)acrylate; and hydroxy (meth)acrylates each having two or more (meth)acryloyl groups such as glycerin di(meth)acrylate, pentaerythritol tri(meth)acrylate, ditrimethylolpropane tri(meth)acrylate, dipentaerythritol penta(meth)acrylate, and sorbitol penta(meth)acrylate. These examples may be used alone or in combination of two or more thereof.

In particular, hydroxy (meth)acrylates each having a single (meth)acryloyl group such as hydroxyethyl (meth)acrylate and hydroxypropyl (meth)acrylate are preferred because a hard coating layer in which fingerprints left thereon are less likely to be noticed and fingerprints left thereon are easily wiped off is obtained.

The urethane (meth)acrylate (A) used in the present invention is prepared through a reaction in which the polyalkylene glycol (C) having a weight-average molecular weight (Mw) in a range of 5,000 to 30,000, the polyisocyanate (D), and the (meth)acrylate (E) intramolecularly including a hydroxyl group serve as essential raw-material components.

The urethane acrylate (A) can be prepared by, for example, a process (hereafter, abbreviated as a "first process") in which a reaction between the polyalkylene glycol (C) and the polyisocyanate (D) is caused to prepare an isocyanate-group-containing urethane prepolymer, and a reaction between the isocyanate-group-containing urethane prepolymer and the (meth)acrylate (E) and intramolecularly including a hydroxyl group is caused. Alternatively, the urethane acrylate (A) can be prepared by a process (hereafter, abbreviated as a "second process") in which a reaction between an excessive amount of the polyisocyanate (D) and the (meth)acrylate (E) intramolecularly including a hydroxyl group is caused, and a reaction between the remaining isocyanate groups of the isocyanate (D) and the polyalkylene glycol (C) is caused. When the polyisocyanate (D) is a diisocyanate, the reactions of the first process are preferably performed. When the polyisocyanate (D) is a polyisocyanate having three or more isocyanate groups, the reactions of the second process are preferably performed.

In the first process, the isocyanate-group-containing urethane prepolymer prepared through the reaction between the polyalkylene glycol (C) and the polyisocyanate (D) can be obtained by various methods. For example, the prepolymer can be obtained by causing a reaction between a polyalkylene glycol and a diisocyanate at 80° C. for 2 hours with 500 ppm tin(II) octanoate serving as a catalyst in the presence of a polymerization inhibitor methoquinone at 300 ppm.

When the isocyanate-group-containing urethane prepolymer is prepared, a ratio $[F_C/F_D]$ where $F_C$ represents the number of moles of a hydroxyl group of the polyalkylene glycol (C) and $F_D$ represents the number of moles of an isocyanate group of the polyisocyanate (D) is preferably in a range of 1/1.05 to 1/3, more preferably in a range of 1/1.2 to 1/3.

The reaction between the isocyanate-group-containing urethane prepolymer and the (meth)acrylate (E) intramolecularly including a hydroxyl group is caused, for example, at 80° C. for 2 hours with 500 ppm tin(II) octanoate serving as a catalyst in the presence of a polymerization inhibitor methoquinone at 300 ppm.

The reaction between the isocyanate-group-containing urethane prepolymer and the (meth)acrylate (E) intramolecularly including a hydroxyl group is preferably caused such that a ratio $[E_{NCO}/F_E]$ where $F_{NCO}$ represents the number of moles of an isocyanate group of the isocyanate-group-containing urethane prepolymer and $F_E$ represents the number of moles of a hydroxyl group of the (meth)acrylate intramolecularly including a hydroxyl group is in a range of 1/1 to 1/1.2, more preferably in a range of 1/1.01 to 1/1.05.

The thus-prepared urethane (meth)acrylate (A) according to the present invention preferably has a weight-average molecular weight (Mw) in a range of 15,000 to 70,000, more preferably in a range of 20,000 to 55,000, because the resultant composition is highly balanced in terms of affinity for fingerprint components, anti-scratch properties, and compatibility.

The polyfunctional (meth)acrylate (B) used in the present invention may be selected from a monomeric polyfunctional (meth)acrylate (b1) and an oligomeric polyfunctional (meth)acrylate (b2) that has a molecular weight in a range of 600 to 3,000. Examples of the monomeric polyfunctional (meth)acrylate (b1) include di(meth)acrylates such as butanediol di(meth)acrylate, hexanediol di(meth)acrylate, ethoxylated hexanediol di(meth)acrylate, propoxylated hexanediol di(meth)acrylate, diethylene glycol di(meth)acrylate, polyethylene glycol di(meth)acrylate, polypropylene glycol di(meth)acrylate, neopentyl glycol di(meth)acrylate, ethoxylated neopentyl glycol di(meth)acrylate, and hydroxypivalic acid neopentyl glycol di(meth)acrylate;

tri(meth)acrylates such as trimethylolpropane tri(meth)acrylate, ethoxylated trimethylolpropane tri(meth)acrylate, propoxylated trimethylolpropane tri(meth)acrylate, tris 2-hydroxyethylisocyanurate tri(meth)acrylate, and glycerin tri(meth)acrylate;

(meth)acrylates having a functionality of 4 or more such as pentaerythritol tri(meth)acrylate, dipentaerythritol tri(meth)acrylate, ditrimethylolpropane tri(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate; and (meth)acrylates in which the foregoing (meth)acrylates have been partially substituted with alkyl groups or ε-caprolactone.

Examples of the oligomeric polyfunctional (meth)acrylate (b2) that has a molecular weight in a range of 600 to 3,000 include polyester (meth)acrylate, urethane (meth)acrylate, epoxy (meth)acrylate, and acrylic (meth)acrylate. Such polyfunctional (meth)acrylates (B) may be used alone or in combination of two or more thereof. The polyfunctional (meth)acrylate preferably has a weight-average molecular weight (Mw) in a range of 600 to 3,000 because the resultant coating film has excellent anti-scratch properties.

The polyfunctional (meth)acrylate (B) used in the present invention is preferably the oligomeric polyfunctional (meth)acrylate (b2) having a molecular weight in a range of 600 to 3,000, more preferably a polyfunctional urethane (meth)acrylate because the resultant active-energy-ray-curable resin composition provides a cured coating film having excellent anti-scratch properties. This polyfunctional urethane (meth)acrylate is preferably a reaction product of pentaerythritol tri(meth)acrylate and hexamethylene diisocyanate.

The urethane (meth)acrylate and the monomeric polyfunctional (meth)acrylate (b1) are preferably used in combination because a hard coating layer having high curability, high anti-scratch properties, and high transparency is provided. The monomeric polyfunctional (meth)acrylate (b1) is preferably dipentaerythritol pentaacrylate or dipentaerythritol hexaacrylate. More preferably, a mixture of a polyfunctional urethane (meth)acrylate, dipentaerythritol pentaacrylate, and dipentaerythritol hexaacrylate is used. At this time, a mass ratio of a dipentaerythritol pentaacrylate (b5) to a dipentaerythritol hexaacrylate (b6) is preferably in a range of 3/7 to 7/3, more preferably in a range of 4/6 to 5/5. A mass ratio [(b56)/(b4)] of a mixture (b56) of the dipentaerythritol pentaacrylate (b5) and the dipentaerythritol hexaacrylate (b6) to a urethane (meth)acrylate (b4) is preferably in a range of [1/2] to [2 to ].

In the present invention, the urethane (meth)acrylate (A) and the polyfunctional (meth)acrylate (B) are contained such that a mass ratio [(A)/(B)] is in a range of [0.1/99.9] to [15/85]. By using the urethane (meth)acrylate (A) so as to satisfy this range, a hard coating layer is provided in which fingerprints left thereon are less likely to be noticed and fingerprints left thereon are easily wiped off, without causing a decrease in the hardness of the hard coating layer. The urethane (meth)acrylate (A) and the polyfunctional (meth)acrylate (B) are preferably contained such that the mass ratio [(A)/(B)] is in a range of 0.1/99.9 to 10/90, more preferably in a range of 0.1/99 to 5/95.

An active-energy-ray-curable resin composition according to the present invention may contain an organic solvent unless advantages of the present invention are not degraded. In general, this organic solvent preferably has a boiling point of 50° C. to 200° C. because a resin composition for an active-energy-ray-curable coating material and an active-energy-ray-curable coating material that are excellent in terms of processibility at the time of coating and drying properties before and after curing are provided. Examples of the organic solvent include alcohol solvents such as methanol, isopropyl alcohol, n-butanol, and isobutanol; ester solvents such as methyl acetate, ethyl acetate, butyl acetate, ethylene glycol monoethyl ether, ethylene glycol monoethyl ether acetate, and ethylene glycol monobutyl ether acetate; ketone solvents such as acetone, methyl ethyl ketone, and methyl isobutyl ketone; aromatic solvents such as toluene and xylene; and mixtures of the foregoing.

When an active-energy-ray-curable resin composition obtained in the present invention contains an organic solvent, for example, after the resin composition for an active-energy-ray-curable coating material is applied to a support to form a layer formed of the active-energy-ray-curable resin composition on the support and before this layer is irradiated with active energy rays, the organic solvent is preferably removed. The organic solvent may be removed with, for example, a hot-air dryer. Although the amount of the organic solvent used is not particularly limited, it is generally in a range such that the solid-matter concentration of the coating material becomes 10 to 70 mass %.

An active-energy-ray-curable resin composition according to the present invention may contain a photo-polymerization initiator depending on the purpose. The photo-polymerization initiator may be selected from various compounds. Examples of the photo-initiator include compounds that generate radicals due to hydrogen extraction, such as benzophenone, benzil, Michler's ketone, thioxanthone, and anthraquinone. Such compounds are generally used in combination with methylamine, diethanolamine, and tertiary amines such as N-methyldiethanolamine and tributylamine.

Examples of the photo-polymerization initiator further include compounds that generate radicals due to intramolecular cleavage. Specific examples of these compounds include benzoin, a dialkoxyacetophenone, an acyloxime ester, a benzil ketal, a hydroxyalkylphenone, and a halogenoketone.

For example, a polymerization inhibitor such as hydroquinone, benzoquinone, toluhydroquinone, and paratertiary-butylcatechol may be optionally added in combination with a photo-polymerization initiator.

To enhance the surface smoothness of the resultant coating film, various leveling agents including fluorine-based agents, silicone-based agents, and hydrocarbon-based agents may be added in amounts (about 0.005 to 1 mass %) as long as the anti-fingerprint properties are not degraded. To increase the hardness of the resultant coating film, inorganic fine particles (particle size: 5 to 100 nm) such as silica gel may be added in an amount (about 0.1 to 50 mass %) as long as the transparency is not degraded.

A cured product according to the present invention is formed by curing the above-described energy-ray-curable resin composition. Examples of the active energy rays include electron beams, ultraviolet rays, and gamma rays. The irradiation conditions are determined in accordance with the composition of the active-energy-ray-curable coating material used for forming the protective layer. In the case of irradiation with ultraviolet rays, irradiation is generally preferably performed with an integrated irradiation dose of 10 to 5000 mj/cm$^2$, more preferably 50 to 1000 mj/cm$^2$. In the case of irradiation with electron beams, the irradiation dose is preferably 1 to 5 Mrad.

A film according to the present invention includes a film-shaped base and a cured layer formed on the film-shaped base by curing the above-described active-energy-ray-curable resin composition.

The film-shaped base is, for example, a plastic film. Examples of the plastic film include films formed of polyethylene, polypropylene, triacetylcellulose, polyethylene terephthalate, vinyl chloride, and polycarbonate.

The layer of the active-energy-ray-curable resin composition is formed on the film base through application by, for example, a coating process such as a gravure coating process, a roll coating process, a spray coating process, a lip coating process, or a comma coating process; or a printing process such as a gravure printing process or a screen printing process. The application is preferably performed such that the cured protective layer has a thickness of 0.1 to 400 μm, more preferably 1 to 50 μm.

When an active-energy-ray-curable resin composition containing an organic solvent is used, the organic solvent is removed generally after the layer of the active-energy-ray-curable resin composition is formed on the base film. The organic solvent may be removed by simply leaving the layer until the organic solvent evaporates, or drying the layer with a dryer or the like. The removal of the organic solvent is generally preferably performed at a temperature of 70° C. to 130° C. for about 10 seconds to 10 minutes.

The layer of the active-energy-ray-curable coating material is formed by, for example, the above-described process and this coating-material layer is then irradiated with active energy rays. Thus, a film according to the present invention is obtained.

EXAMPLES

Hereinafter, the present invention will be described further in detail with reference to examples and comparative examples. In the following description, all parts and % are based on mass unless otherwise specified.

In Examples according to the present invention, weight-average molecular weight (Mw) and number-average molecular weight (Mn) were measured by gel permeation chromatography (GPC) under the following conditions.

Measurement apparatus; HLC-8220GPC manufactured by Tosoh Corporation

Columns; TSK-GUARDCOLUMN SuperHZ-L manufactured by Tosoh Corporation

+TSK-GEL SuperHZM-M×4, manufactured by Tosoh Corporation

Detector; RI (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 μl) obtained by filtering a tetrahydrofuran solution having a concentration of 0.2 mass % in terms of resin solid matter through a microfilter Synthesis Example 1

Synthesis of Urethane Acrylate (A1)

A flask was charged with 4000 g (0.5 mol) of a polyalkylene glycol 1 [weight-average molecular weight (Mw): 8000] and 174 g (1 mol) of toluene diisocyanate. The flask was further charged with tin(II) octanoate at 200 ppm and zinc(II)

octanoate at 200 ppm that served as catalysts, dibutylhydroxytoluene serving as an antioxidant at 3000 ppm, and methoquinone serving as a polymerization inhibitor at 300 ppm. In addition, normal-butyl acetate was added such that the solid content became 80%. The resultant solution was mixed and the temperature in the system was adjusted to be 80° C.

A reaction was caused at 80° C. for an hour with the air being blown into the system to prepare a urethane prepolymer having an isocyanate group. After that, 116 g (1 mol) of hydroxyethyl acrylate was added to the system. A reaction was made to proceed until isocyanate groups in the system completely disappeared while the temperature in the system was maintained at 80° C. As a result, a urethane acrylate (A1) having a weight-average molecular weight (Mw) of 19,889 and a number-average molecular weight (Mn) of 14,232 was prepared.

Synthesis Examples 2 and 3

Synthesis of Urethane Acrylates (A2) and (A3)

A urethane acrylate (A2) and a urethane acrylate (A3) were prepared as in Synthesis example 1 except that synthesis was performed with raw materials and mixing amounts described in Table 1. The weight-average molecular weight (Mw) and the number-average molecular weight (Mn) of the urethane acrylates (A2) and (A3) are described in Table 1.

Synthesis Example 4

Synthesis of Urethane Acrylate (A4)

A flask was charged with 266 g (0.4 mol) of IPDI (isophorone diisocyanate) nurate and 104 g (0.8 mol) of HPA. The flask was further charged with tin(II) octanoate at 200 ppm and zinc(II) octanoate at 200 ppm that served as catalysts, dibutylhydroxytoluene serving as an antioxidant at 3000 ppm, and methoquinone serving as a polymerization inhibitor at 300 ppm. In addition, normal-butyl acetate was added such that the solid content became 80%. The resultant solution was mixed and the temperature in the system was adjusted to be 80° C. A reaction was caused at 80° C. for an hour with the air being blown into the system to prepare a urethane acrylate having an isocyanate group. After that, 3000 g (0.2 mol) of a polyalkylene glycol 2 [weight-average molecular weight (Mw): 15000] was added to the system. A reaction was made to proceed until isocyanate groups in the system completely disappeared while the temperature in the system was maintained at 80° C. As a result, a urethane acrylate (A4) was prepared. The weight-average molecular weight (Mw) and the number-average molecular weight (Mn) of the urethane acrylate (A4) are described in Table 1.

Synthesis Example 5

Synthesis of Urethane (meth)acrylate (a1) for Control

A urethane acrylate (a1) for control was prepared as in Synthesis example 1 except that synthesis was performed with raw materials and mixing amounts described in Table 1. The weight-average molecular weight (Mw) and the number-average molecular weight (Mn) of the urethane acrylate (a1) are described in Table 1.

Synthesis Example 6

Synthesis of Urethane (meth)acrylate (a2) for Control

A flask was charged with 4000 g (2 mol) of a polyalkylene glycol 3 [weight-average molecular weight (Mw): 2000] and 222 g (1 mol) of isophorone diisocyanate. The flask was further charged with tin(II) octanoate at 200 ppm and zinc(II) octanoate at 200 ppm that served as catalysts, dibutylhydroxytoluene serving as an antioxidant at 3000 ppm, and methoquinone serving as a polymerization inhibitor at 300 ppm. In addition, normal-butyl acetate was added such that the solid content became 80%. The resultant solution was mixed and the temperature in the system was adjusted to be 80° C.

A reaction was caused at 80° C. for an hour with the air being blown into the system until isocyanate groups in the system completely disappeared. As a result, a urethane resin (a2) was prepared. The weight-average molecular weight (Mw) and the number-average molecular weight (Mn) of the urethane acrylate (a2) are described in Table 1.

TABLE 1

| Synthesis example | 1 | 2 | 3 | 4 | 5 | 6 |
|---|---|---|---|---|---|---|
| Urethane acrylate | A1 | A2 | A3 | A4 | a1 | a2 |
| Polyalkylene glycol 1 | 1 | | | | | |
| Polyalkylene glycol 2 | | 1 | 1 | 1 | | |
| Polyalkylene glycol 3 | | | | | 1 | 2 |
| TDI | 2 | | | | | |
| H12MDI | | 2 | | | | |
| IPDI | | | 2 | | 1 | 1 |
| IPDI nurate | | | | 2 | | |
| HEA | 2 | | | | | |
| HPA | | 2 | 2 | 4 | | |
| PETA | | | | | 1 | |
| Mw | 19,889 | 43,857 | 47,136 | 67,295 | 6,684 | 7,439 |
| Mn | 14,232 | 33,415 | 35,836 | 48,663 | 5,688 | 5,640 |

Footnote of Table 1
The values in the table represent the number of moles.
Polyalkylene glycol 1: glycol having polypropyleneoxy chains and a weight-average molecular weight (Mw) of 8000
Polyalkylene glycol 2: glycol having polypropyleneoxy chains and a weight-average molecular weight (Mw) of 15000
Polyalkylene glycol 3: glycol having polypropyleneoxy chains and a weight-average molecular weight (Mw) of 2000
TDI: toluene diisocyanate
H12MDI: 4,4'-dicyclohexylmethane diisocyanate
IPDI: isophorone diisocyanate
HEA: hydroxyethyl acrylate
HPA: hydroxypropyl acrylate
PETA: pentaerythritol triacrylate

Synthesis Example 7

Synthesis of Polyfunctional (meth)acrylate (B)

A flask was charged with 535.5 parts by mass of a mixture of pentaerythritol triacrylate and pentaerythritol tetraacrylate (mass ratio: 60/40). The flask was further charged with tin(II) octanoate at 200 ppm and zinc(II) octanoate at 200 ppm that served as catalysts, dibutylhydroxytoluene serving as an antioxidant at 3000 ppm, and methoquinone serving as a polymerization inhibitor at 300 ppm. In addition, normal-butyl acetate was mixed such that the solid content became 80%. The temperature in the system was adjusted to be 50° C.

While the air was blown into the system, hexamethylene diisocyanate was added three separate times in a total amount of 84 parts by mass. The temperature in the system was increased to 80° C. and a reaction was made to proceed at 80°

C. until isocyanate groups in the system completely disappeared. As a result, a urethane acrylate (B1) was prepared. GPC analysis indicated that the urethane acrylate (B1) had a mass-average molecular weight (Mw) of 1,400. The acryloyl equivalent was 109 g/mol.

Example 1

An active-energy-ray-curable composition (1) having a solid content of 50% was prepared by mixing 3 parts of the urethane acrylate (A1), 48.5 parts of the urethane acrylate (B1), 48.5 parts of the mixture of dipentaerythritol pentaacrylate and dipentaerythritol hexaacrylate (mass ratio: 40/60), 4 parts by mass of 1-hydroxycyclohexyl phenyl ketone, and 104 parts of normal-butyl acetate. This composition (1) was used to form a hard coating layer on a film under conditions described below. The hard coating layer was evaluated in terms of hardness, the degree to which fingerprints left thereon are less likely to be noticed, and ease of wiping off fingerprints left thereon in the following manner. The evaluations of the degree to which fingerprints are less likely to be noticed and the ease of wiping off fingerprints were performed at the initial stage where the hard coating layer was formed and at a stage after the process of putting and removing fingerprints was repeated 20 times. The removal of fingerprints was performed in a manner described below in Evaluation of ease of wiping off fingerprints. Note that 48.5 parts of the urethane acrylate (B1) and 48.5 parts of the mixture of dipentaerythritol pentaacrylate and dipentaerythritol hexaacrylate (mass ratio: 40/60) had an acryloyl equivalent of 104 g/mol.

<Method for Forming Hard Coating Layer>

The composition (1) was applied to a PET film with a bar coater such that the dry film would have a thickness of 5 μm. The applied composition was dried at 70° C. for 5 minutes to evaporate the solvent; and was irradiated with ultraviolet rays with a high-pressure mercury-vapor lamp (80 W/cm) at an irradiation dose of 500 mJ/cm$^2$. Thus, the hard coating layer was obtained. The irradiation with ultraviolet rays was performed in a nitrogen atmosphere.

<Evaluation Method for Hardness>

A pencil hardness measurement was performed in accordance with JIS K5600-5-4. A measurement process was performed five times with respect to a single hardness and a hardness at which no scratches were made during four or more processes was determined as the hardness of the cured coating film.

<Evaluation of Degree to which Fingerprints are Less Likely to be Noticed (Quantitative Evaluation)>

The quantitative evaluation of the degree to which fingerprints are less likely to be noticed was conducted on the basis of the angle of visibility. The angle of visibility is an angle at which fingerprints start to be noticeable while the angle of visual inspection for fingerprints left on the hard coating layer is gradually decreased from 90°. The lower the angle of visibility, the better the degree to which fingerprints are less likely to be noticed.

<Evaluation of Ease of Wiping Off Fingerprints (Quantitative Evaluation)>

The evaluation of ease of wiping off fingerprints was conducted on the basis of the number of times wiping had to be performed to remove fingerprints from the hard coating layer. Specifically, quantitative evaluation was conducted on the basis of the number of times a piece of tissue paper was moved back and forth under 1 Kg (with respect to 5.7 cm$^2$) over fingerprints left on the hard coating layer until the fingerprints became completely invisible. The smaller the number of back and forth movements, the easier it was to wipe off fingerprints.

Examples 2 to 4 and Comparative Examples 1 to 3

Active-energy-ray-curable resin compositions 2 to 4 and active-energy-ray-curable resin compositions 1' to 3' for control were prepared as in Example 1 except that compositions described in Table 2 were employed. The results of evaluations performed as in Example 1 are described in Table 3.

TABLE 2

| | Example | | | | Comparative example | | |
|---|---|---|---|---|---|---|---|
| | 1 | 2 | 3 | 4 | 1 | 2 | 3 |
| Composition | 1 | 2 | 3 | 4 | 1' | 2' | 3' |
| Urethane acrylate (A1) | 3 | | | | | | |
| Urethane acrylate (A2) | | 3 | | | | | |
| Urethane acrylate (A3) | | | 3 | | | | |
| Urethane acrylate (A4) | | | | 3 | | | |
| Urethane acrylate (a1) | | | | | 3 | | |
| Urethane acrylate (a2) | | | | | | 3 | |
| Polyfunctional acrylate (B1) | 48.5 | 48.5 | 48.5 | 48.5 | 48.5 | 48.5 | 50 |
| Polyfunctional acrylate (B2) | 48.5 | 48.5 | 48.5 | 48.5 | 48.5 | 48.5 | 50 |
| Photo-initiator | 4 | 4 | 4 | 4 | 4 | 4 | 4 |
| Diluting solvent | 104 | 104 | 104 | 104 | 104 | 104 | 104 |

Footnote of Table 2
Polyfunctional acrylate (B2): mixture of dipentaerythritol pentaacrylate and dipentaerythritol hexaacrylate (mass ratio: 40/60)
The mixture of the polyfunctional acrylate (B1) and the polyfunctional acrylate (B2) with a mass ratio of 1:1 had an acryloyl-group equivalent of 104 g/mol.
Photo-initiator: 1-hydroxycyclohexyl phenyl ketone
Diluting solvent: normal-butyl acetate

TABLE 3

| | Example | | | | Comparative example | | |
|---|---|---|---|---|---|---|---|
| | 1 | 2 | 3 | 4 | 1 | 2 | 3 |
| Unnoticeability (initial stage) | 50 | 40 | 40 | 50 | 70 | 60 | 80 |
| Unnoticeability (after 20 wipes) | 50 | 40 | 40 | 50 | 80 | 90 | 90 |
| Ease of wiping off (initial stage) | 3 | 1 | 1 | 3 | 7 | 7 | >20 |
| Ease of wiping off (after 20 wipes) | 3 | 1 | 1 | 3 | 16 | >20 | >20 |
| Blind test | 2 | 6 | 4 | 2 | 0 | 1 | 0 |
| Hardness | 3H | 3H | 3H | 3H | 3H | 3H | 3H |

In addition, a blind test was performed for hard coating layers of the compositions (1) to (4) and the compositions (1') to (3') in terms of degree to which fingerprints are less likely to be noticed at the initial stage and ease of wiping off fingerprints at the initial stage. Specifically, 15 randomly selected evaluators that were not told the names of the compositions, individually selected the composition that was seemingly the best in terms of degree to which fingerprints are less likely to be noticed and ease of wiping off fingerprints. As for the evaluation, Table 3 describes the number of evaluators that selected each composition.

The above-described results of Examples indicate that Examples 1 to 4 within the scope of the present invention are better than Comparative examples at the initial stage in terms of degree to which fingerprints are less likely to be noticed and ease of wiping off fingerprints. In Comparative examples, the degree to which fingerprints are less likely to be noticed and the ease of wiping off fingerprints after 20 wipes are degraded with respect to the initial stage. In contrast, in Examples, these properties do not have differences between the initial stage and after 20 wipes, hence it has been found that Examples also achieve high durability.

The invention claimed is:

1. An active-energy-ray-curable resin composition comprising:
   a urethane (meth)acrylate (A) prepared through a reaction in which a polyalkylene glycol (C) having a weight-average molecular weight (Mw) in a range of 5,000 to 30,000, a polyisocyanate (D), and a (meth)acrylate (E) intramolecularly including a hydroxyl group serve as essential raw-material components; and
   a polyfunctional (meth) acrylate (B), with a mass ratio [(A)/(B)] of (A) to (B) being in a range of 0.1/99.9 to 15/85,
   wherein the polyfunctional (meth)acrylate (B) includes both a monomeric (meth) acrylate (b1) having a functionality of 4 or more and an oligomeric polyfunctional (meth) acrylate (b2) that has a molecular weight in a range of 600 to 3,000.

2. The active-energy-ray-curable resin composition according to claim 1, wherein the polyalkylene glycol (C) is polypropylene glycol.

3. The active-energy-ray-curable resin composition according to claim 1, wherein the polyisocyanate (D) is an alicyclic diisocyanate.

4. The active-energy-ray-curable resin composition according to claim 1, wherein the (meth)acrylate (E) including a hydroxyl group is a hydroxy (meth)acrylate that has a single (meth)acryloyl group.

5. The active-energy-ray-curable resin composition according to claim 1, wherein the urethane (meth)acrylate (A) is prepared through a reaction between the polyalkylene glycol (C) and the polyisocyanate (D) with a ratio $[F_C/F_D]$ being in a range of 1/1.05 to 1/3 where $F_C$ represents number of moles of a hydroxyl group of the polyalkylene glycol (C) and $F_D$ represents number of moles of an isocyanate group of the polyisocyanate (D), the reaction providing an isocyanate-group-containing urethane prepolymer; and through a reaction between the isocyanate-group-containing urethane prepolymer and the (meth)acrylate (E) intramolecularly including a hydroxyl group with a ratio $[F_{NCO}/F_E]$ being in a range of 1/1 to 1/1.2 where $F_{NCO}$ represents number of moles of an isocyanate group of the isocyanate-group-containing prepolymer and $F_E$ represents number of moles of a hydroxyl group of the (meth)acrylate (E) intramolecularly including a hydroxyl group.

6. The active-energy-ray-curable resin composition according to claim 1, wherein the oligomeric polyfunctional (meth) acrylate (b2) that has a molecular weight in a range of 600 to 3,000 is a polyfunctional urethane (meth)acrylate.

7. The active-energy-ray-curable resin composition according to claim 1, wherein a mass ratio [(b1)/(b2)] of the monomeric polyfunctional (meth)acrylate (b1) to the oligomeric polyfunctional (meth)acrylate (b2) that has a molecular weight in a range of 600 to 3,000 is in a range of 1/2 to 2/1.

8. A cured product formed by curing the active-energy-ray-curable resin composition according to claim 1.

9. A film comprising a film-shaped base and a cured layer formed on the film-shaped base by curing the active-energy-ray-curable resin composition accoring to claim 1.

10. A cured product formed by curing the active-energy-ray-curable resin composition according to claim 2.

11. A cured product formed by curing the active-energy-ray-curable resin composition according to claim 3.

12. A cured product formed by curing the active-energy-ray-curable resin composition according to claim 4.

13. A cured product formed by curing the active-energy-ray-curable resin composition according to claim 5.

14. A film comprising a film-shaped base and a cured layer formed on the film-shaped base by curing the active-energy-ray-curable resin composition according to claim 2.

15. A film comprising a film-shaped base and a cured layer formed on the film-shaped base by curing the active-energy-ray-curable resin composition according to claim 3.

16. A film comprising a film-shaped base and a cured layer formed on the film-shaped base by curing the active-energy-ray-curable resin composition according to claim 4.

17. A film comprising a film-shaped base and a cured layer formed on the film-shaped base by curing the active-energy-ray-curable resin composition according to claim 5.

* * * * *